United States Patent [19]
Adolfsson et al.

[11] Patent Number: 5,052,823
[45] Date of Patent: Oct. 1, 1991

[54] MAGNETIC BEARING BUSHING I

[75] Inventors: Rune Adolfsson, Varberg; Göran Lindsten, Mölndal, both of Sweden

[73] Assignee: SKF Nova AB, Gothenburg, Sweden

[21] Appl. No.: 540,149

[22] Filed: Jun. 19, 1990

[30] Foreign Application Priority Data

Jun. 21, 1989 [SE] Sweden ............................ 8902242

[51] Int. Cl.⁵ .................... F16C 33/82; F16C 32/06
[52] U.S. Cl. ................................... 384/133; 384/114
[58] Field of Search ............... 384/133, 114, 115, 117, 384/118, 125, 280, 286, 291, 309, 311, 312, 312, 397, 368, 371, 192, 313, 316

[56] References Cited
U.S. PATENT DOCUMENTS 4,598,914  7/1986  Furumura et al. ............ 384/133 X
4,602,873  7/1986  Izumi et al. ................... 384/397 X
4,717,266  1/1988  Hart, Jr. et al. ............... 384/133 X Primary Examiner—Thomas R. Hannon
Attorney, Agent, or Firm—Eugene E. Renz, Jr.

[57] ABSTRACT

A bearing bushing incorporating a sleeve (1) of magnetizable material forming the sliding surface of the bearing, a shaft (2) mounted in said sleeve (1) and a lubricant in the form of a magnetic fluid (3) between the sliding surface of the sleeve (1) and the shaft (2), whereby the sleeve (1) is magnetized in an axial direction. For causing a hydrodynamic lubrication and an increased cooling effect the sleeve (1) has a number of radial holes (4) through which the magnetic fluid (3) may pass to the other side of the sleeve (1), and which, by the axial magnetic field about the sleeve (1), is given a circulating motion along the inner and outer side of the sleeve.

4 Claims, 1 Drawing Sheet

MAGNETIC BEARING BUSHING I

FIELD OF THE INVENTION

The present invention relates to a bearing bushing incorporating a sleeve of magnetizable material forming the sliding surface of the bearing, a shaft mounted in said sleeve and a lubricant in the form of a magnetic fluid between the sliding surface of the sleeve and the shaft, whereby the sleeve is magnetized in an axial direction.

BACKGROUND OF THE INVENTION

Magnetic bearings of the above mentioned type are used in many applications, e.g. at disk storages for computers and in domestic machines. Bearings of this type are used in these applications to achieve silent operation, extended operation life, and high rotational accuracy. An important advantage of such bearings is that lubricant leakage is prevented because the magnetic field generated by the magnetic bearing sleeve retains the lubricant, which contains mangetizable particle material.

In DE-A-3.304.623 is shown a magnetic bearing incorporating a magnetic bearing sleeve, which on its surface facing the shaft has grooves for causing a hydrodynamic pressure in the magnetic fluid. This device has a complex design, and the shape of the grooves furthermore requires that the shaft be continuously rotated in the same direction.

SUMMARY OF THE INVENTION

The purpose of the present invention is to provide a bearing of the above type characterized by novel features of construction and arrangement to provide hydrodynamic lubrication and efficient cooling, and which is simple and inexpensive to manufacture. This is achieved by providing a sleeve having a number of radial holes through which magnetic fluid may pass to the outer side of the sleeve and through an axial magnetic field around the sleeve. This arrangement produces a circulating motion of the magnetic fluid along the inner and outer side of the sleeve.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
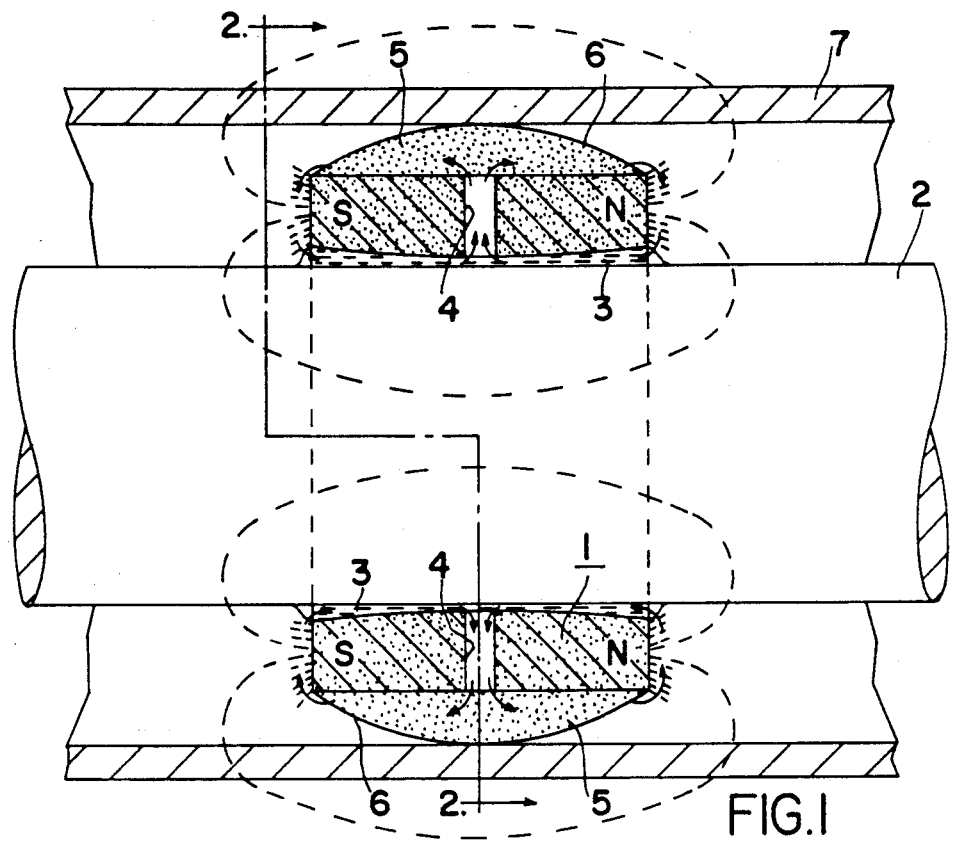
FIG. 1 is an axial section through a bearing bushing according to the invention and having a shaft positioned therein.
Figure 2:
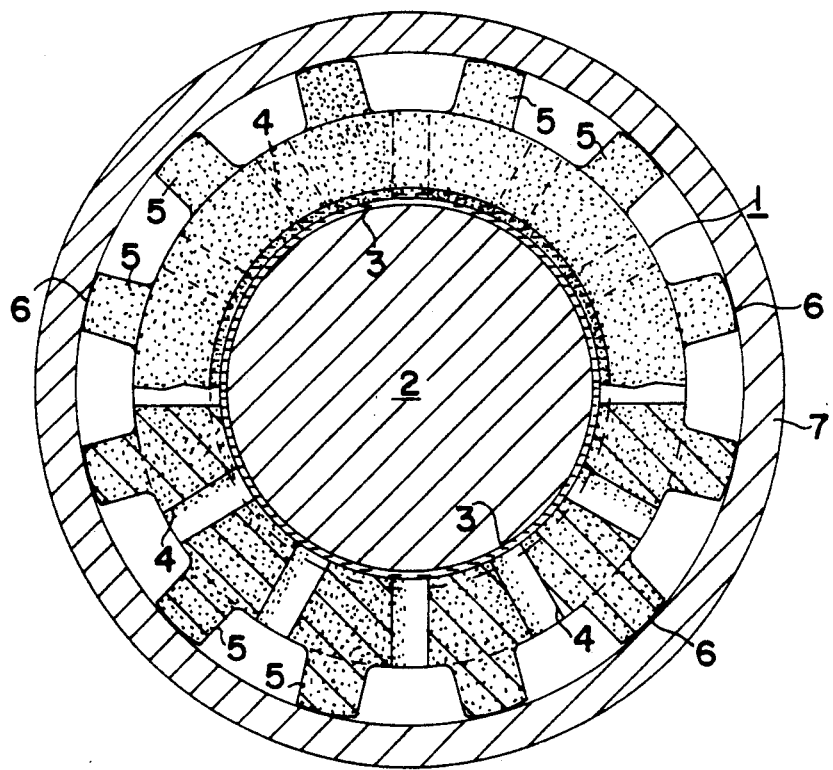
FIG. 2 is a section along line 2—2 in FIG. 1.

The bearing bushing generally designated B incorporates a sleeve 1 of magnetizable material, preferably a synthetic material, in which have been embedded magnetic particles, e.g. magnetite particles. The sleeve 1 is mounted on a shaft 2. The shaft 2 may be of a magnetic or non-magnetic material. Between the sleeve 1 and the shaft 2 is introduced a lubricant in the form of a magnetic fluid 3, a so called "ferro-fluid", i.e. a colloidal dispersion or suspension of small magnetic particles in a carrier fluid, such as oil. The magnetic particles are retained in stable colloidal suspension by means of a dispersant. Such magnetic fluids can be introduced and retained in such spaces without use of a physical container by means of the magnetic field.

The sleeve 1 is magnetized in an axial direction, i.e. the magnetic fluid 3 gathers at the ends of the sleeve 1 thereby sealing it off. As shown in the drawing, the sleeve 1 has a number of radial holes 4 through which magnetic fluid 3 may pass to the outer side of the sleeve 1. The axial magnetic field around the sleeve 1 induces circulation of the magnetic fluid 3 which provides a cooling effect.

In order to further improve this cooling effect the sleeve 1 has external radial cooling flanges 5. The radial holes 4 are preferably located between the external cooling flanges 5. The external cooling flanges 5 preferably have spherical set up surfaces 6 for the sleeve 1 in a bearing housing 7, or the like. The sleeve 1 furthermore preferably has a cambered inner form for taking up shaft obliquities.

As mentioned above, the sleeve 1 is manufactured from a synthetic material, e.g. plastic or rubber with embedded magnetite particles or an embedded magnetizable steel spring. The advantages of a sleeve of magnetizable plastic material are obvious, e.g. it may be manufactured by injection molding and it is possible to give it complex shapes.

What is claimed is:

1. A bearing bushing incorporating a sleeve (1) of magnetized material forming the sliding surface of the bearing and having external axial cooling flanges (5), a shaft (2) mounted in said sleeve (1) and a lubricant in the form of a magnetic fluid (3) between the sliding surface of the sleeve (1) and the shaft (2), whereby the sleeve (1) is magnetized in an axial direction.

2. The bearing bushing as claimed in claim 1, characterized by radial holes (4) situated between the cooling flanges (5).

3. The bearing bushing as claimed in claim 1, characterized therein, that the cooling flanges (5) have spherical surface portions (6) forming a spherical set up surface for the sleeve (1).

4. A bearing bushing incorporating a sleeve (1) of magnetized material forming the sliding surface of the bearing, a shaft (2) mounted in said sleeve (1) and a lubricant in the form of a magnetic fluid (3) between the sliding surface of the sleeve (1) and the shaft (2), whereby the sleeve (1) is magnetized in axial direction, characterized therein, that the sleeve (1) has a number of radial holes (4) through which the magnetic fluid (3) may pass to the outer side of the sleeve (1), and which, by the axial magnetic field around the sleeve (1), is given a circulating motion along the inner and outer side of the sleeve.

* * * * *